United States Patent
Goiffon et al.

[11] 3,815,470
[45] June 11, 1974

[54] SERVO FEED SYSTEM FOR MACHINE TOOL PROVIDED WITH LOCKING MECHANISM

[75] Inventors: Thierry Goiffon, Ferney-Voltaire, France; Hans Rudolf Lehmann, Geneva; Hubert Schaidl, Aire-Geneva, both of Switzerland

[73] Assignee: Ateliers des Charmilles, S.A., Geneva, Switzerland

[22] Filed: Sept. 28, 1972

[21] Appl. No.: 293,047

Related U.S. Application Data

[62] Division of Ser. No. 61,219, Aug. 5, 1970, Pat. No. 3,695,144.

[52] U.S. Cl. .......................................... 91/41, 92/28
[51] Int. Cl. .............................................. F15b 15/26
[58] Field of Search .......... 91/41, 44, 45; 92/24, 26, 92/27, 28; 188/67, 170

[56] References Cited
UNITED STATES PATENTS

| | | | |
|---|---|---|---|
| 2,889,895 | 6/1959 | Snow | 92/28 |
| 2,988,058 | 6/1961 | Warnecke | 91/45 |
| 3,150,571 | 9/1964 | Frassetto et al. | 92/28 |
| 3,251,278 | 5/1966 | Royster | 92/27 |
| 3,420,144 | 1/1969 | Berry | 91/45 |
| 3,665,812 | 5/1972 | Hashimoto et al. | 92/27 |

*Primary Examiner*—Edgar W. Geoghegan
*Assistant Examiner*—A. M. Zupcic

[57] ABSTRACT

A locking mechanism for a hydraulically actuated movable rod member of a machine tool, such as the electrode tool holder of an electron-erosion machining apparatus, consisting of a locking member preferably in the form of an annular expansible member surrounding a linearly and/or angularly displaceable rod member and normally biased in engagement with the surface of the rod member. The annular member is supported by a stationary element of the machine and normally engages the rod member so as to immobilize it in a predetermined position as long as the machine servo mechanism is not activated. When the machine servo mechanism is activated, pressurized fluid is introduced in a chamber dependent from the annular member, causing an expansion of the annular member releasing the rod member for normal actuation thereof by the servo mechanism.

4 Claims, 5 Drawing Figures

SERVO FEED SYSTEM FOR MACHINE TOOL PROVIDED WITH LOCKING MECHANISM

CROSS REFERENCE TO RELATED APPLICATION

The present application is a division of application Ser. No. 61,219, filed Aug. 5, 1970, now U.S. Pat. No. 3,695,144.

BACKGROUND OF THE INVENTION

The present invention constitutes an improvement to servo mechanisms normally used, for example, for controllably displacing a machine tool element such as a ram, tool holder, and the like, and adapted to prevent linear and/or angular displacement of the movable element except under control of the machine servo mechanism.

In many machine tools such as boring machines, milling machines, and more particularly apparatus for machining workpieces by electro-erosion, such as electro-mechanical machining apparatus and electrical discharge machining apparatus, a servo mechanism is provided for displacing a movable element of the machine, for example a tool holder, at a predetermined feed rate or in response to a control signal relatively to a workpiece. In apparatus for machining workpieces by electro-erosion, a hydraulic servo system is often used for feeding an electrode tool relatively to the workpiece. The electrode tool is mounted on a holder mounted on the end of a rod attached to a piston slidably disposed in a cylinder fastened to a stationary portion of the machine. Pressurized hydraulic fluid is controllably introduced into and exhausted from the cylinder such as to cause displacement of the piston, the piston rod and the electrode tool in an appropriate direction and at a controlled rate providing correct operation of the machine. When the machine is stopped, the pump supplying the hydraulic servo system in pressurized fluid is shut off, and due to the loss of fluid pressure in the system, the piston is no longer maintained and supported in an appropriate position. Under the influence of gravity exerted on the movable assembly of the system consisting of the piston, the piston rod and electrode tool, especially in machines where such assembly is disposed vertically, the natural tendency is for the piston, piston rod and electrode tool to be displaced toward the workpiece such that the electrode tool may hit the workpiece with resulting damages to the electrode tool or the workpiece, or both.

The present invention remedies such inconvenience by providing a locking mechanism automatically engaging the piston rod and preventing linear and/or angular displacement of the piston rod as long as the hydraulic servo system of the machine is shut off. The locking mechanism is automatically released as soon as the machine is started.

SUMMARY

The principal object of the invention is to provide a locking mechanism for a movable element of a machine tool for preventing unvoluntary and accidental displacement of such movable element, unless the servo mechanism normally controlling the displacements of such movable element is in normal operation.

In electro-erosion machining apparatus, for which the invention has more particular applications, the electrode tool is generally supported vertically by a rod member attached to a piston slidably disposed in a cylinder mounted on a stationary portion of the machine and is normally displaced during operation of the machine by hydraulic fluid introduced in the cylinder under the control of a servo mechanism responsive to the electrical conditions existing in the machining zone, such as to feed the electrode tool into the workpiece at a controlled rate maintaining a predetermined gap between the electrode tool working face and the electro-eroded surface of the workpiece. As long as the servo feed mechanism of the machine operates in a normal manner, the piston rod and the electrode tool holder mounted on the end thereof are free to be displaced under the control of the servo mechanism, but as soon as the machine is shut off, the locking mechanism of the present invention automatically immobilizes the piston rod thus preventing linear and/or angular displacement thereof. The locking mechanism is automatically released as soon as the hydraulic fluid in the hydraulic servo system of the machine reaches a predetermined pressure.

DETAILED DESCRIPTION OF THE PREFERRED EMBODIMENTS

A locking mechanism according to the present invention may be incorporated in any machine or apparatus wherein it is desired to prevent the unvoluntary and accidental displacement of a movable power servo actuated element such as a tool relatively to a stationary element such as a workpiece, unless the servo system normally providing controlled displacement of the movable element is in normal operation. Although the invention has general applications to the machine tool and related art, the invention will be hereinafter explained in detail in particular applications to electro-erosion machining apparatus, such apparatus being represented for illustrative purpose only, by an electrical discharge machining (EDM) apparatus.

Figure 1:
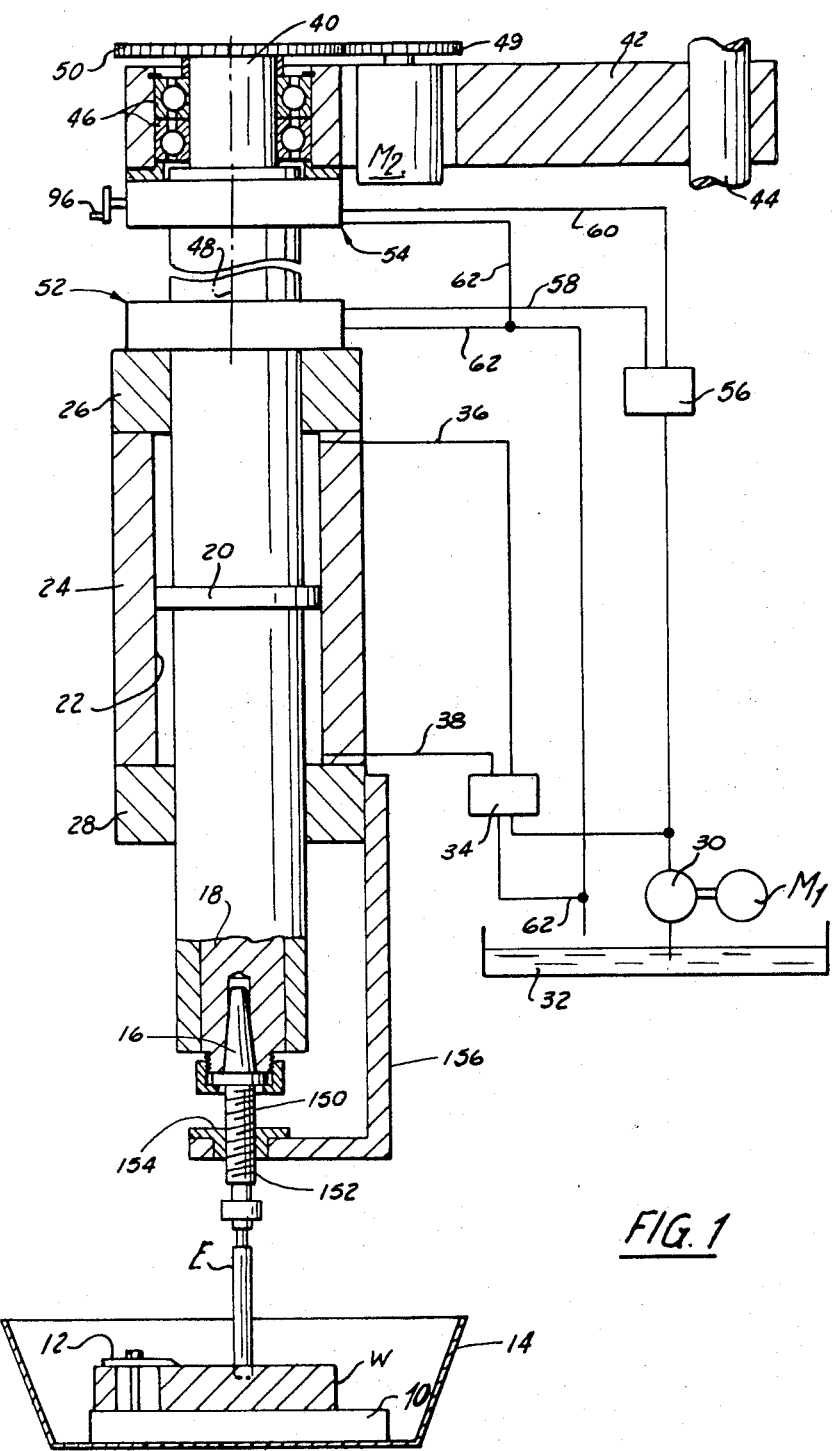
FIG. 1 is a schematic elevation view, partly in section, of a portion of an electro-erosion machining apparatus provided with the locking mechanism of the invention.

Referring now to FIG. 1 a typical electro-erosion machining apparatus of the electrical discharge machining type is partially represented in its elements essential to the comprehension of the present invention. The apparatus includes a base, not shown, having a workpiece support 10 adapted to support a workpiece W mounted thereon by any convenient means such as clamping means 12. The workpiece support 10 and the workpiece W are preferably disposed in an enclosure 14 normally filled with an appropriate dielectric liquid. An electrode tool E is attached to an appropriate tool holder 16 mounted on the lower end of a ram or rod member 18 provided with a piston 20. The piston 20 is slidably disposed in the internal bore 22 of a vertically disposed cylinder 24 mounted on a stationary portion of the machine. As shown in FIG. 1, the rod 18 is supported and guided through the two ends of the cylinder 24 by bearings 26 and 28 which may take the form of any conventional bearing, but which are preferably the hydrostatic bearings disclosed in copending application Ser. No. 688,462, filed Dec. 6, 1967. The linear displacement of the rod 18 is controlled by the differential action of a pressurized fluid introduced in the cylinder 24 on both sides of the piston 20. For that purpose, a hydraulic servo mechanism is provided which, as schematically represented, includes an electric motor M1 driving a pump 30 having its inlet connected to a reservoir 32 containing a hydraulic fluid and an outlet which, by way of a control valve 34, delivers and exhausts fluid under an appropriate pressure differential through lines 36 and 38 to and from the cylinder 24 on both sides of the piston 20. In this manner, the piston 20, the piston rod 18 and the electrode tool E are linearly displaced in an appropriate direction and at a controlled rate resulting in feeding the electrode E relatively to the workpiece W according to the rate of electro-erosion removal of material from the machining surface of the workpiece.

In the example of apparatus illustrated at FIG. 1, the rod 18 is rotatably supported at its upper end 40 from an arm 42 mounted for linear longitudinal displacement along a support column 44 affixed to the frame of the machine, the end 40 of the rod 18 being journalled in the arm 40 by way, for example, of ball bearing 46. The rod 18 is thus free to be angularly displaced in rotation around its axis 48, and a variable speed motor M2 is affixed to the arm 42 such as to permit controllable rotational drive of the rod 18 by means of the transmission gear train consisting of a pinion 49 mounted on the end of the drive shaft of the motor M2 and a toothed wheel 50 mounted on the end 40 of the rod 18.

The structure illustrated at FIG. 1 further comprises a pair of locking mechanisms for the rod 18, shown respectively at 52 and 54. The locking mechanism 52 is shown mounted on the end of the cylinder 24 and is adapted to prevent linear displacement of the rod 18 unless the apparatus is in normal machining operation with its servo system activated. The locking mechanism 54 is mounted on the arm 42 and is adapted to prevent angular motion in rotation of the rod 18 unless the servo mechanism of the machine is activated. The operation of the locking mechanisms 52 and/or 54 is controlled by means, for example, of a control valve 56 which permits to connect either of the locking mechanisms, or both, to the pressure side of the pump 30 by lines 58 and 60, respectively, so as to place the appropriate locking mechanism, or both, with a fluid under pressure for the purpose of releasing them. Lines 62 generally represent in FIG. 1 the return lines for the hydraulic system.

Figure 2:
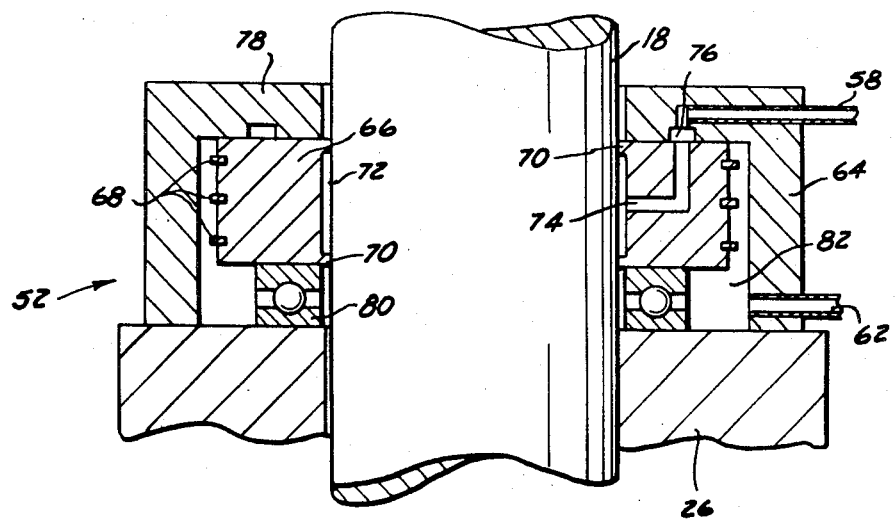
FIG. 2 is an enlarged view showing the details of an example of locking mechanism according to the present invention.

Referring now to FIG. 2, there is shown in detail an example of locking mechanism generally designated at 52, adapted to prevent rectilinear displacement of the rod 18, unless the hydraulic system of the machine is activated, while still permitting rotational angular displacement of the rod. The locking mechanism 52 comprises a cup shaped housing 64 mounted on the end of the bearing 26 supporting and guiding the rod 18 through the upper end of the cylinder 24. Within the housing 64 there is disposed an expansible annular member 66 made of any appropriate resilient material, such as an elastometric material. The expansible annular member 66 is provided on its peripheral surface with biasing means 68 which may take the form of a coil spring or of a plurality of spring rings which normally tend to contract the annular member such as to cause the surface of its internal bore 70 to engage firmly the corresponding peripheral surface of the rod 18. An annular groove 72 is formed on the internal bore 70 of the annular member 66 such as to define an annular chamber surrounding the peripheral surface of the rod 18. The annular groove 72 is placed in communication by way of a passageway 74 with a circular groove 76 formed in the inner surface of the closure end plate 78 of the housing 64. The circular groove 76 is connected to the line 58 such that fluid under pressure may be controllably supplied to the annular chamber formed by the annular groove 72. The annular member 66 is supported relatively to the bearing 26 by a thrust bearing such as ball bearing 80.

Normally, under the influence of the biasing means 68, the expansible annular member 66 is contracted such that its inner bore 70 firmly engages the corresponding peripheral surface of the rod 18. Thus longitudinal rectilinear displacement of the rod 18 is prevented, but angular rotational motion of the rod 18 is permitted because the expansible annular member 66 can rotate relatively to the bearing 26 as a result of being supported therefrom by way of the thrust bearing defined by the ball bearing 80. The amount of friction resulting from the contact between the upper surface of the expansible annular member 66 and the lower surface of the housing end plate 78 is negligible, under such conditions, and does not hamper free rotation of the rod 18.

When the EDM machine is turned on, the motor M1 (FIG. 1) is activated and the pump 30 begins to supply pressurized fluid to the hydraulic servo system. As soon as the fluid pressure reaches a predetermined value, the control valve 56 directs fluid under pressure to the line 58, thus in turn supplying fluid under pressure to the annular chamber 72 of the expansible annular member 66 (FIG. 2). The fluid under pressure in the annular chamber 72 thus causes the expansible annular member 66 to expand against the action of the biasing means 68, such that the surface of the inner bore 70 of the expansible annular member 66 no longer engages the corresponding peripheral surface of the rod 18. The rod 18 is thus free to be rectilinearly and angularly displaced. The hydraulic fluid leaking along the surface of the rod 18 is collected in a chamber 82 defined by the interior of the housing 64 and returned to the hydraulic system by means of the drain pipe 62.

Figure 3:
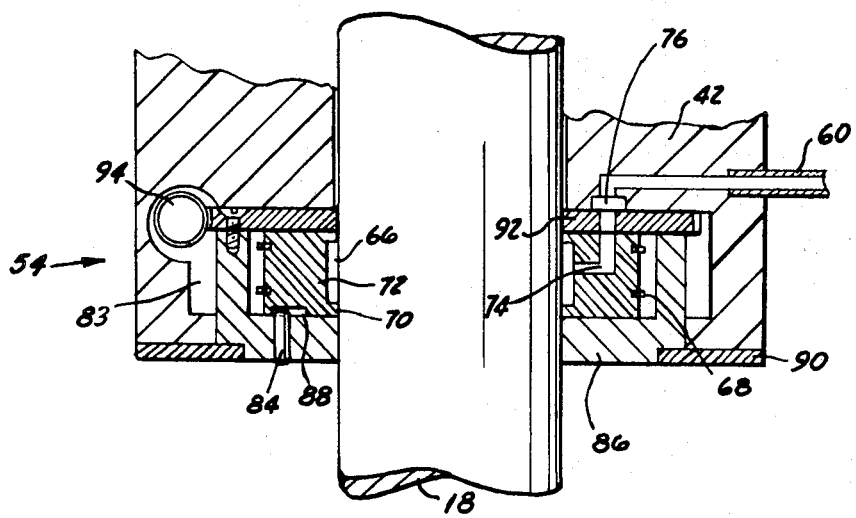
FIG. 3 is a view similar to FIG. 2 but showing a modification of the structure shown in FIG. 2.

FIG. 3 represents in detail an example of the locking mechanism 54 normally preventing angular rotational movement of the rod 18 and shown at FIG. 1 mounted below the arm 42. The locking mechanism 54 is disposed generally in an annular space 83 provided in the arm 42 and surrounding the rod 18. The expansible annular member 66 provided with biasing means 68 on the peripheral surface thereof is held against rotational motion by means such as pins 84 projecting from a rigid annular plate 86 and each having an end disposed in a radially elongated groove 88 disposed in the lower face of the expansible annular member 66. The rigid annular plate 86 is held in the space 83 in the arm 42 by means of a bearing ring 90 and is provided with a toothed wheel 92 whose teeth mesh with a worm 94 which may be manually rotated by means of a handwheel 96, shown at FIG. 1. In this manner, when no pressurized fluid is present in the annular chamber 72, the expansible annular member 66 is contracted so that the surface of its internal bore 70 firmly engages the corresponding peripheral surface of the rod 18, and the annular member 66 is prevented from freely rotating relatively to the arm 42 because of the ends of the pins 84 engaged in the radial grooves 88 on the face of the expansible annular member. However, the annular rigid plate 86 may be rotatably driven by way of the worm 94 driven by handwheel 96, thus causing manual controlled angular orientation of the annular member 66 through the intermediary of the pins 84. In this manner when the locking mechanism 54 is engaged, the rod 18 may nevertheless be angularly positioned with precision by means of the handwheel 96. As soon as fluid under pressure is admitted to the annular chamber 72, the expansible annular member 66 is expanded, thus releasing the rod 18. Any fluid leaking from the chamber 72 is recovered in the annular space 83 and returned to the hydraulic fluid supply system by an appropriate drain pipe, not shown.

Figure 4:
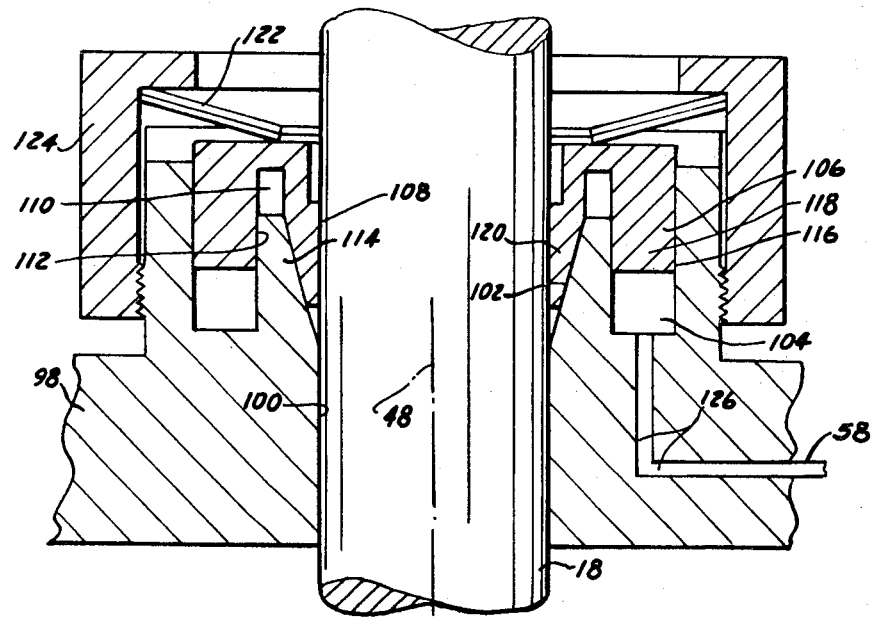
FIG. 4 is a view representing a further modification of the invention.

FIG. 4 represents a further modification of the invention. This modification comprises a support member 98 adapted for mounting to a stationary element of the machine, such as for example, the bearing plate 26 closing the upper end of the hydraulic cylinder 24. The support member 98 has a bore 100 providing a passage therethrough for the rod 18. A portion of the bore 100 is tapered so as to form a frusto conical surface 102 concentric with the longitudinal axis 48 of the rod 18. A substantially circular groove 104 is formed in the support member 98, concentrically disposed around the frusto conical portion 102 of the bore 100. A generally cup-shaped member 106 made of an appropriate elastic material, such as a hard elastometric material, is provided with a cylindrical internal bore 108 of a diameter slightly larger than the outer diameter of the rod 18. A circular groove is formed in the annular member 106, as shown at 110, which defines a first cylindrical wall 112 in sliding engagement with the inner wall of the circular groove 104 formed in the support member 98. The other wall of the circular groove 110 forms a frusto-conical surface 114 conforming with and in sliding engagement with the frusto-conical surface 102 in the support member 98. The outer cylindrical surface 116 of the annular member 106 is in sliding engagement with the outer cylindrical walls of the circular groove 104 in the support member 98 so as to form a generally annular piston element 118 slidably displaceable within the circular groove 104 and integrally connected to a concentrically disposed wedging portion 120 defined between the internal bore 108 and the frusto-conical surface 114 of the annular member 106. A biasing means, which in the structure represented at FIG. 4 is in the form of a pair of dished spring washers such as Belleville washers 122 maintained by a cap 124 threaded over a portion of the support member 98 or fastened thereto by any convenient means, normally biases the annular member 106 in a direction which tends to contract the wedging portion 120 of the annular member, as a result of the frusto-conical surface 114 thereof riding unto the frusto-conical surface 102 of the support member 98, thus resulting in a decrease of the internal diameter of the bore 108 which thus firmly engages the corresponding peripheral surface of the rod 18. In this manner, longitudinal and angular displacements of the rod 18 are prevented.

A passageway 126 in the support member 98 places the circular groove 104 therein in communication with the line 58, such that when pressurized fluid is introduced from the line 58 through the passageway 126 to the annular groove 104, the annular member 106 is lifted against the compression of the spring 122, with the result that the wedging portion 120 of the annular member 106 is permitted to elastically expand such that the surface of its internal bore 108 no longer engages the corresponding peripheral surface of the rod 18.

Figure 5:
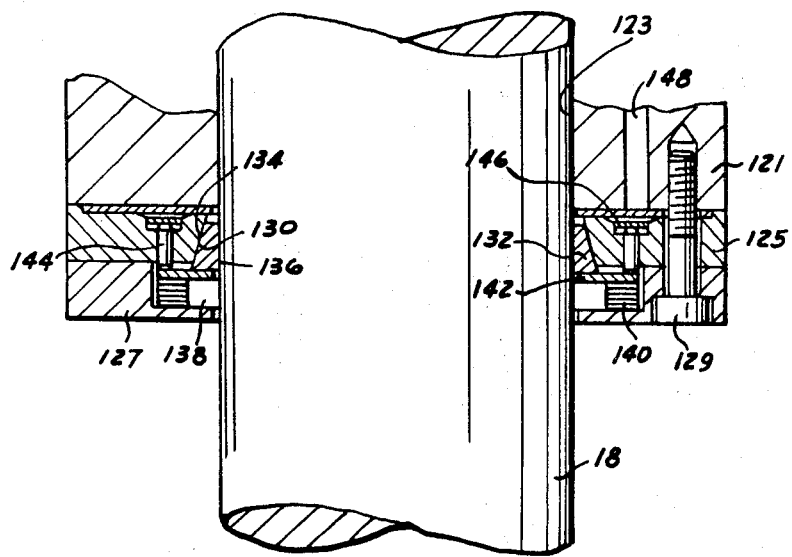
FIG. 5 is a view representing yet a further modification of the invention.

FIG. 5 represents a modification of the arrangement of FIG. 4. This modification comprises a support member 121, attached to or integral with a stationary portion of the machine such as a bearing plate closing the end of the hydraulic cylinder, and having a bore 123 through which the rod 18 is movable longitudinally or angularly, or both. A pair of superimposed plate members 125 and 127 are fastened below the support member 121 by way of bolts 129. The plate member 125, disposed between the support member 121 and the outer plate member 127, has a frusto-conical inner bore 130 disposed concentrically around the corresponding portion of the periphery of the rod 18. A resilient expansible annular member 132, having an outer frusto-conical surface 134 corresponding to the inner frusto-conical bore 130 and an inner cylindrical bore 136 of a diameter normally slightly larger than the diameter of the rod 18 is disposed between the surface of the inner frusto-conical bore 130 in the plate member 125 and the peripheral surface of the rod 18. The plate member 125 is provided with an annular space 138 in which are disposed a plurality of normally compressed coil springs 140 each having an end engaging a washer 142 disposed in contact with the largest face of the expansible annular member 132 so as to normally urge the annular member 132 in an upward direction, as seen in the drawing, causing a wedging of the annular member into the frusto-conical space defined by the frusto-conical inner bore 130 of the plate member 125. In this manner, the expansible annular member 132 is normally contracted so that its inner bore surface 136 firmly engages the corresponding peripheral surface of the rod 18. A plurality of plungers 144 are slidably disposed in corresponding longitudinal apertures in the plate member 125 with an end of each plunger abutting against the upper face of the washer 142, as seen in the drawing. The other end of each plungers 144 engages the surface of a deformable annular diaphram 146, the interior of which may be controllably filled with pressurized fluid by means of a passageway 148 disposed in the support member 120. In this manner, the biasing action of the springs 140 which causes a locking of the rod 18 as a result of forcing the resilient annular member 132 in wedging engagement between the peripheral surface of the rod and the surface of the frusto-conical bore 130 is counterbalanced as soon as fluid under a predetermined pressure is introduced by means of passageway 148 to the interior chamber of the deformable annular diaphragm 146, thus displacing the plungers 144 in a direction that tends to compress the springs 140, thus in turn freeing the rod 18 for longitudinal and angular displacements.

It can be seen that the arrangements of FIGS. 4 and 5 generally provide for both longitudinal and angular locking of the rod 18. By mounting the support member of the locking mechanism of the type illustrated either at FIG. 4 or FIG. 5 by means of a thrust bearing relatively to the stationary element of the machine, the rod 18 is locked only against rectilinear displacement. By mounting the support member of the locking mechanism from the stationary element of the machine by means of an angularly adjustable arrangement similar to that described with respect to the embodiments of FIG. 3, uncontrolled accidental rectilinear and angular displacements of the rod 18 are prevented, although the rod 18 may be manually angularly oriented to any desired position. As previously mentioned with respect to FIGS. 2 and 3, in both the embodiments of FIGS. 4 and 5 any fluid leakage may be recovered and returned to the hydraulic system by means of adequate return lines.

Referring once again to FIG. 1, the electrode tool holder 16 mounted at the bottom end of the rod 18 is shown provided with a mandrel 150 having a thread 152 engaging the threaded internal bore of a guide bushing 154 mounted on the end of a bracket 156 fastened to a stationary portion of the machine. With such an arrangement it is obvious that rotation of the rod 18, driven in rotation by means of the electric motor M2, results in feed or advance of the electrode E into the workpiece. It is often desirable in electro-erosion machining of a workpiece to rectilinearly translate the electrode tool relatively to the workpiece while rotating the electrode in order to provide improved precision of dimension and roundness of holes being electro-eroded in the workpiece. Such a desirable result is achieved by the structure illustrated. The arrangement illustrated at FIG. 1 can also be used for machining by electro-erosion a workpiece having a bore provided with helical splines or with threads. It can also be seen that if the threaded mandrel 150 and the threaded guide bushing 154 are omitted, the rod 18 may be rectilinearly reciprocated by means of the hydraulic servo system independently of or conjointly with being angularly rotated by means of the motor M2. The locking mechanism provided by the present invention in its diverse aspects permit to prevent the longitudinal translation of the rod 18 while it is controllably rotated, or permit the longitudinal rectilinear translation of the rod while being held against rotation in conjunction with or independently from the electro-erosion operation. For example, the arrangement of FIG. 1 permits to accurately position the electrode tool E relatively to a pre-drilled bore in the workpiece W. An appropriate feeler gauge is mounted on the end of the electrode holder, the rod 18 is locked against rectilinear motion by way of the locking mechanism of the invention as illustrated at 52 in FIG. 2, the rod 18 is rotated, either manually or by means of the motor M2, and adequate adjustment of the position of the workpiece W is effected until the axis of the rod 18 is accurately positioned in coincidence with the axis of the pre-drilled bore in the workpiece.

It will also be obvious to those skilled in the art that alternate means to those represented at FIG. 1 may be provided for controlling the unlocking of the locking mechanisms of the invention. For example, the control valve 56 may be an electrically operated valve adapted to supply fluid under pressure to the appropriate locking means for releasing the same only when the motor M1 driving the pump 30 is turned on or, alternately, as a result of a predetermined voltage being developed between the electrode tool E and the workpiece W after the electro-erosion machining apparatus is turned on.

Having thus described the invention by way of typical structural representations thereof, what is sought to be protected by United States Letters Patent is as follows:

1. In a servo feed mechanism providing controlled rectilinear displacement of a rod member relatively to a stationary element and to bearing means for said rod member, locking means attached to said stationary element and normally engaging said rod member for preventing rectilinear displacement of said rod member relatively to said stationary element, means for disengaging said locking means from said rod member for permitting free movement thereof relatively to said stationary element only upon actuation of the servo feed mechanism for causing controlled rectilinear displacement of said rod member relatively to said bearing means and said stationary element, wherein said locking means prevents free angular motion of said rod member when said locking means is engaged with said rod member, and means associated with said locking means for permitting controlled angular positioning of said rod member.

2. The locking means of claim 1 comprising an expansible annular member disposed around said rod member, biasing means normally contracting said annular member in engagement with said rod member and means for expanding said annular member out of engagement from said rod member.

3. The locking means of claim 1 wherein the means for permitting controlled angular positioning of said rod member comprises a second annular member disposed between said expansible annular member and said stationary element, means interconnecting said expansible annular member and said second annular member for allowing expansion and contraction of said expansible annular member relatively to said second annular member while preventing angular displacement therebetween, and means for angularly adjusting said second annular member relatively to said stationary element.

4. In a fluid operated servo feed mechanism comprising a cylinder supported by a stationary element, a reciprocable piston disposed in the cylinder, a rod member attached to the piston for rectilinear displacement thereby, a bearing in at least one end of the cylinder for supporting and guiding the rod member, the piston being reciprocated as a result of a pressurized fluid being introduced in the cylinder on one side or the other of the piston, locking means for the rod member comprising a locking member supported by said stationary element, biasing means normally urging said locking member into engagement with said rod member, means for causing said locking member to disengage from said rod member as soon as the pressure of said fluid reaches a predetermined value, wherein said locking member comprises an expansible annular member disposed around said rod member, biasing means normally contracting said annular member in engagement with said rod member, fluid operated means for expanding said annular member out of engagement from said rod member, a rigid annular member disposed between said expansible annular member and said stationary element, means interconnecting said expansible annular member and said rigid annular member for allowing expansion and control of said expansible annular member relatively to said rigid annular member while preventing angular displacement therebetween, and means for angularly adjusting said second annular member relatively to said stationary element.

* * * * *